Feb. 16, 1960 J. MARLEY 2,925,527
MAGNETIC DEFLECTION SYSTEM
Filed Dec. 24, 1956 3 Sheets-Sheet 1

Feb. 16, 1960 J. MARLEY 2,925,527
MAGNETIC DEFLECTION SYSTEM
Filed Dec. 24, 1956 3 Sheets-Sheet 3

United States Patent Office 2,925,527
Patented Feb. 16, 1960

2,925,527

MAGNETIC DEFLECTION SYSTEM

John Marley, Roslyn Heights, N.Y., assignor to Hazeltine Research, Inc., a corporation of Illinois Application December 24, 1956, Serial No. 630,370

9 Claims. (Cl. 315—27)

This invention relates to magnetic deflection systems for cathode-ray tubes and, while not restricted thereto, is particularly useful in connection with multi-gun cathode-ray tubes of the type used in color-television receivers.

Multi-gun cathode-ray tubes of the type used in color-television receivers for reproducing the color image are characterized by having three electron guns, one for each of the primary colors, which are mechanically positioned to cause the corresponding electron beams to converge at the center of the display screen. The display screen surface is covered with the three primary color phosphors arranged in a desired pattern. A color control structure is positioned a short distance behind the phosphor layer for directing the individual beams to their respective color phosphors. In order that the phosphor elements excited by the three beams for a given image point may appear to the human eye to blend together to give a spot of a single color, it is necessary that the three beams converge at the surface of this control structure so as to pass through the same aperture in the control structure. It is known, however, that the fact that some of the beams are incident into the main deflection field at different angles causes these beams to be deflected differently by the main deflection field. Because they are deflected differently, that is, by different amounts, the three beams will converge at points different from the surface of the color-control structure and, hence, pass through different apertures in such structure. This causes a noticeable separation of the resulting color spots, which separation is commonly referred to as "degrouping." The magnitude of this degrouping depends on the amount of deflection that is being experienced, the greater the deflection, the greater the degrouping.

It has been proposed to overcome this degrouping or "misconvergence" of the three beams in a three-gun color tube by use of so-called "dynamic convergence circuits." In this case, there are special circuits each having corresponding pole pieces and coil windings for developing auxiliary magnetic fields which individually operate on different ones of the electron beams before they reach the main deflection field to give a sufficient additional deflection such that all three beams will pass through the same aperture in the color-control structure. Because of the fact that the degree of misconvergence varies with the amount of deflection, the strength of these auxiliary fields must also vary with the amount of deflection. As is known, the desired field variations may be obtained by supplying to each dynamic convergence coil a complex current wave form which takes the form of horizontal (line scan) frequency parabolas superimposed on vertical (field scan) frequency parabolas. Such a wave form is usually developed by obtaining signals from each of the vertical and horizontal deflection circuits, shaping these signals, and then combining them in a tuned resonant circuit. Though usually not utilizing any tubes, such circuits are relatively complex in nature and generally have an undesirably large number of adjustable controls. This large number of controls makes the adjustment of the dynamic convergence a relatively complex matter. Also, because the dynamic convergence wave forms are derived from signals from the vertical and horizontal deflection circuits, such wave forms tend to be sensitive to, and to vary with, the supply voltages and circuit constants of the vertical and horizontal deflection circuits.

A problem which is substantially the same as the misconvergence of the three electron beams in a color tube may also be experienced in a single-gun tube, such as a black-and-white cathode-ray tube. This problem occurs in such single-gun tubes for certain cases where the different electrons are incident into the main deflection field at different angles, and, hence, are deflected differently. The end result is that the beam is misconverged or distorted at the display screen, the amount of misconvergence depending on the magnitude of the deflection.

It is an object of the invention, therefore, to provide a new and improved magnetic deflection system for multi-gun color cathode-ray tubes for keeping the electron beams converged at the surface of the color-control structure as the beams scan to and fro.

It is another object of the invention to provide a new and improved magnetic deflection system for multi-gun color cathode-ray tubes which eliminates the need for either some or all of the dynamic convergence circuits heretofore utilized.

It is a further object of the invention to provide a new and improved magnetic deflection system which may, depending on the circumstances, be useful with single-gun cathode-ray tubes for improving the convergence of the electron beam as it is deflected from side to side.

In accordance with the invention, a magnetic deflection system for a cathode-ray tube wherein the different angles of incidence of the electrons into the deflection field region cause the electrons to be deflected differently and, hence, to converge at points different from the surface of the display screen structure as the electrons are deflected from side to side comprises a first deflection coil for deflecting the electrons in a given image direction on a first side of the tube axis, the axial length of the coil portions on this first side of the tube axis being longer than those on a second side of the axis. The magnetic deflection system also includes a second deflection coil for deflecting the electrons in the same image direction but on the second side of the tube axis, the axial length of the coil portions on this second side of the tube axis being longer than those on the first side of the axis. In this system, the proportioning of the axial lengths of the deflection coils serves to produce a composite deflection field having an end boundary of the proper shape to enhance the convergence of the electrons at the screen structure surface. The magnetic deflection system additionally includes circuit means for supplying deflection signals primarily to the first deflection coil when the electrons are to be deflected on the first side of the tube axis and primarily to the second deflection coil when the electrons are to be deflected on the second side of the tube axis.

For a better understanding of the present invention, together with other and further objects thereof, reference is had to the following description taken in connection with the accompanying drawings, and its scope will be pointed out in the appended claims.

Referring to the drawings:

Fig. 1 is a cross-sectional view of a representative three-gun color cathode-ray tube;

Figs. 2, 3, and 4 are magnetic deflection field diagrams used in explaining the present invention;

Fig. 5b is an end view of the deflection coils of Fig. 5a;

Fig. 5c is a top view of the deflection coils of Fig. 5a;

Figure 1:
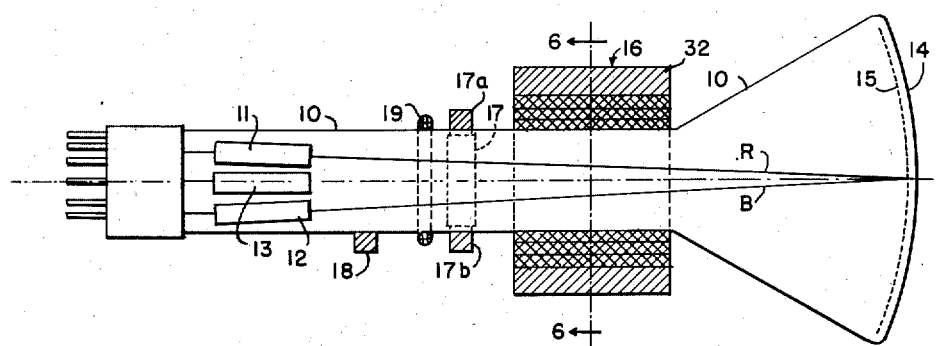

Referring to Fig. 1 of the drawings, there is shown a cross-sectional view of a representative three-gun color cathode-ray tube 10. The cathode-ray tube 10 includes a red electron gun 11, a blue electron gun 12, and a green electron gun 13, each of which serves to produce a narrow stream of electrons which are directed towards the display screen structure at the other end of the tube, the three guns being arranged one above the other as indicated in the drawing. The three guns are usually mechanically positioned so that the three electron beams more or less converge at the center of the display screen, that is, the two outside guns are usually toed-in toward the center of the phosphor screen, no toeing in of the middle gun 13 being required because it is already on the center axis. The display screen structure comprises a phosphor screen 14 which is usually the front end of the glass envelope of the tube 10 on the inner surface of which are deposited the three color phosphors in a desired pattern. The display screen structure also includes a color-control structure 15 positioned a short distance behind the phosphor screen 14. The color-control structure 15 may, for example, take the form of either a shadow mask or a focus grille. By "shadow mask" is meant a structure which, due to the angle of incidence of the beams, serves to direct each beam to its corresponding color phosphor, while "focus grille" denotes a structure which serves to produce between such grille and the phophor screen 14 an electric field which is suitable for directing the beams to their respective color phosphors.

Disposed around the neck of the cathode-ray tube 10 is a deflection yoke 16 for producing the appropriate deflection fields for deflecting the electron beams back and forth across the phosphor screen 14 so as to develop the usual raster pattern. In accordance with the present invention, the internal construction of this deflection yoke 16 may be modified to provide either some or all of the dynamic convergence of the three electron beams as they scan from side to side. Also disposed around the neck of the cathode-ray tube 10 is a permanent magnet assembly 17, two magnets of which are indicated by the magnets 17a and 17b of Fig. 1. Each magnet may be designed to cooperate with internal pole pieces to develop a magnetic field which operates on a corresponding electron beam to provide movement of the beam in a radial direction. Another permanent magnet 18 is also provided for operating on one of the beams to produce tangential movement thereof. These positioning magnets represented by the magnet assembly 17 and the magnet 18 enable the three electron beams to be accurately converged at the center of the phosphor screen 14. This is sometimes referred to as "static" convergence as the magnet fields developed by the permanent magnets remain fixed regardless of the deflection of the beams. It is to be noted that, contrary to present practice, either no or fewer coil windings need be associated with the permanent magnet assembly 17 for producing varying magnetic fields for providing dynamic convergence, provided the principles of the present invention are utilized. In other words, the so-called static convergence is still necessary when the present invention is utilized but the need for the previously utilized form of dynamic convergence is either wholly or partly eliminated, depending on the circumstances.

There is also disposed around the neck of the cathode-ray tube 10 a purity coil 19 for developing a transverse magnetic field which may be utilized to compensate for manufacturing tolerances in the alignment of the gun structure relative to the tube axis. Also, it should be noted that the present invention is not limited to use with cathode-ray tubes having three guns or to color cathode-ray tubes, though, for sake of illustration, the present invention shall be described with reference to this environment because such three-gun color tubes represent a common example of a situation where the teachings of the present invention may be used to great advantage.

Figure 2:
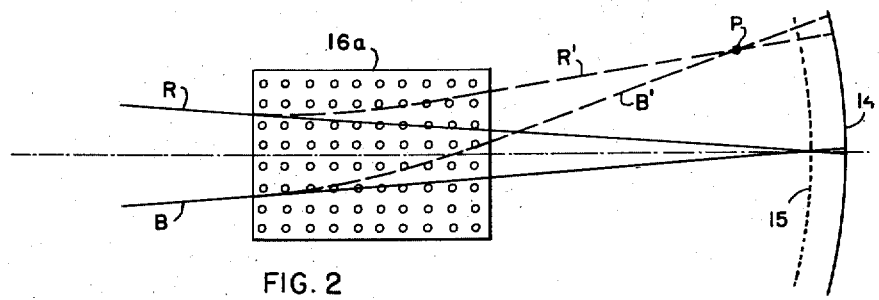

The problems overcome by the present invention and the manner in which they are overcome will now be described by means of the magnetic deflection field diagrams of Figs. 2, 3, and 4. Referring first to Fig. 2, there is represented a magnetic deflection field 16a corresponding to the vertical deflection field of a conventional prior art deflection yoke positioned in the position indicated by the deflection yoke 16 of Fig. 1. Only the vertical deflection field, the flux lines of which are at right angles to the plane of the paper as indicated by the small o's is shown in order to simplify the explanation. Also, for ease of understanding only the red and blue electron beams R and B are shown.

The problem with the prior art deflection field illustrated in Fig. 2 is that the different angles of incidence of the electron beams R and B cause them to be deflected by different amounts and, hence, to converge or cross over at a point P which falls short of the color control structure 15. As a result the two beams, in this case indicated by the dotted line paths R' and B', pass through different apertures in the color control structure 15 and, hence, excite phosphor spots, the separation of which is very noticeable to the human eye. In other words, the red and blue phosphor spots are no longer superimposed as far as the eye is concerned but are separate and distinct spots, the separation being as much as one-half of an inch for the larger angles of deflection. Ideally the three beams, only two of which are illustrated in Fig. 2, should converge at the color control structure 15 so as to pass through the same aperture in such structure 16. Because of the static convergence adjustment, this condition is made to prevail at the center of the display screen. As the beams are deflected away from the center of the display screen, however, the point at which they converge moves further and further back of the color control structure 15 as the degree of deflection increases. As mentioned, this arises from the fact that the beams are incident into the main deflection field 16a at different angles. In other words, assuming a given field strength, then the radius of curvature for each beam in the magnetic field is the same, but due to the different angles of incidence, the different centers of this radius are displaced differently so that the different beams stay within the deflection field region for different lengths of time and, hence, are deflected differently, the amount of the difference increasing as the angle of deflection increases. As will be noted in Fig. 2, the blue beam B stays within the deflection field 16a for a longer period of time and, hence, receives a greater amount of deflection when the beams are being deflected upwardly.

In accordance with the present invention, this defect may be overcome by properly shaping the end boundary at the exit end of the magnetic deflection field. The ideal shaping of the end boundary is indicated in Fig. 3. As indicated by the exit boundary 16c of the magnetic deflection field 16b, the shaping should be such that this end boundary is concave in nature. As a result, the blue beam B will no longer stay within the magnetic field for a longer period of time but rather will emerge at the same time as the red beam R and, hence, each will suffer the same amount of deflection. As a result, the deflected beams R' and B' will converge at the surface of the color control structure 15 and, hence, pass through the same aperture.

Figure 3:
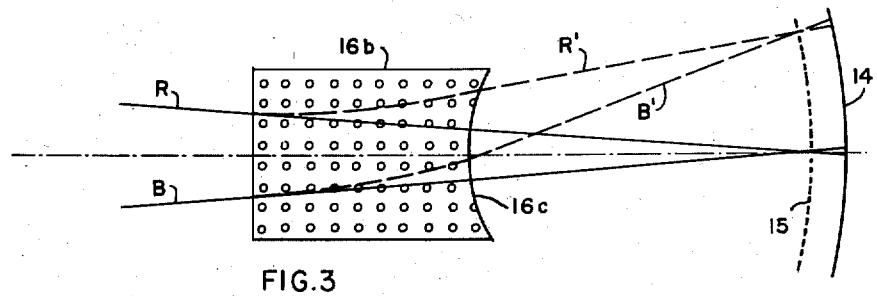

A uniform field having an exit boundary of the shape indicated in Fig. 3 is not readily realizable because the direction of the concave curvature thereof indicates that the conventional field shape is being modified by an additional current source located well on the phosphor screen 14 side of the deflection field 16b. This would require that some of the deflection coils producing the deflection field be located ahead of this end boundary 16c on the phosphor screen 14 side of the field 16b. In practice this could not be done. This suggests that perhaps it is the other or entrance end of the deflection field which should be given the desired shaping. In accordance with the present invention, this might be done. By itself, however, it would be more difficult to produce the desired results entirely in this manner because, for one thing, the beams are very nearly on the axis of the tube at the entrance end and, hence, would be only slightly affected by such a field.

In accordance with the present invention, the desired curvature at the exit end may be approximated to a satisfactory degree by utilizing a pair of deflection fields which individually serve to produce one-half of the desired shape of end boundary. This is shown in Fig. 4. A first vertical deflection field 16d having flux lines coming out of the paper, as indicated by the small o's serves to deflect the electron beams above the tube axis. A second vertical deflection field 16e having flux lines going into the plane of the paper, as indicated by the x's, serves to deflect the electron beams below the center axis of the tube. Each of these deflection fields has an oblique end boundary at the exit end, but the two angles of obliqueness complement one another so as to approximate the desired concave curvature indicated in Fig. 3. Thus when the electron beams are to be deflected upwardly, as indicated by the beam paths R' and B', the deflection field 16d has a suitable boundary to enable the blue beam B to emerge from the deflection field at the same time as the red beam R. That is, the two path lengths in the deflection field are equal. The same consideration applies for the boundary of the other deflection field 16e when the beams are deflected downwardly, as indicated by the beam paths R'' and B''. Obviously, both of these deflection fields cannot be present at the same time with equal intensity because the beams cannot go both up and down at the same time. Accordingly, provision is made, as will be discussed more fully hereinafter, for developing primarily the deflection field 16d when the electron beams are to be deflected above the tube axis and for developing primarily the deflection field 16e when the electron beams are to be deflected below the tube axis.

Suitable coil shapes for developing the desired deflection fields will now be described in connection with Figs. 5a-5c, inclusive. Fig. 5a shows a side view of a deflection coil 20 which is suitable for developing the vertical deflection field 16d of Fig. 4. While from an electrical standpoint it is perfectly proper to refer to the deflection coil 20 in the singular, for reasons of mechanical convenience in the manufacture of deflection yokes it is common practice to split this coil up into a pair or set of coils as represented by the coils 20a and 20b, the latter being best seen in Fig. 5c which is a top view of the deflection coil 20. Ignore for the present the dash line outline of Fig. 5a as this indicates the positioning of a separate set of coils for producing the other vertical deflection field 16e which will be considered hereinafter.

Each of the coils 20a and 20b may be formed by winding a number of turns in the desired trapezoidal pattern and then shaping the resultant coil against a cylindrical forming tool to obtain the desired cylindrical curvature to the coil. A turn of the wire making up coil 20a is indicated at 21. In operation, the coil portions 20a and 20b are electrically connected in series and the resulting current flow is effective to produce magnetic flux which is indicated by the representative flux lines 20c. From an electrical standpoint, the important parts of the coils 20a and 20b are the longitudinal groups of conductors 22, 24, 26, and 28, which conductors are positioned parallel to the longitudinal axis of the cathode-ray tube. It is primarily these longitudinal conductors which develop the desired deflection field. The end conductors, in the case of coil 20a the conductors making up the groups 23 and 25, serve primarily as current return paths for getting the current from one side of the coil to the other. The spacing of the longitudinal conductor groups 22, 24, 26, and 28 about the longitudinal axis of the cathode-ray tube may be seen more clearly by referring to Fig. 5b which is an end view of Fig. 5a.

Figure 4:
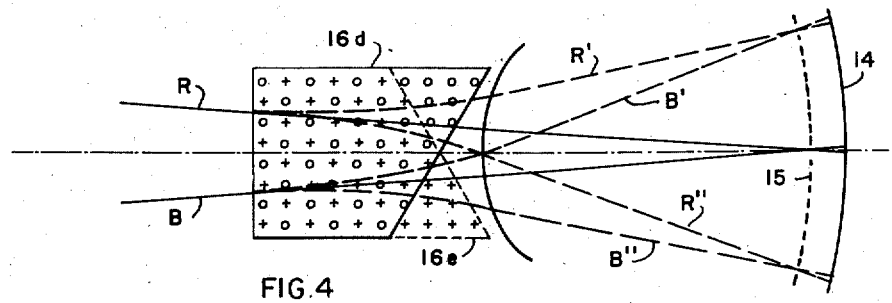
Figure 5A:
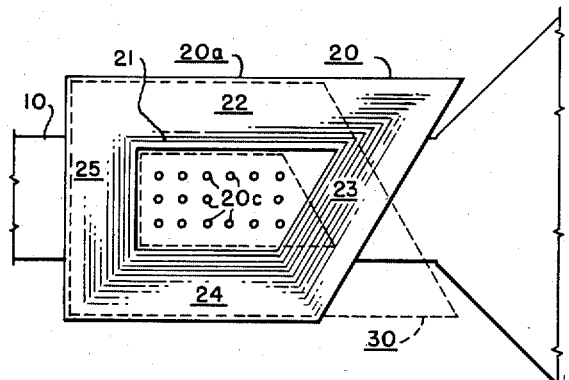
Fig. 5a is a side view of a set of deflection coils constructed in accordance with the present invention.

The set of coils 20 of Fig. 5a is effective to produce the desired oblique end boundary at the exit end of the field, as shown by the field 16d of Fig. 4, because of the fact that the axial length of the conductor groups 22 and 26 on the side of the tube axis to which the beams are to be deflected, is appreciably longer than the effective axial lengths of the conductor groups 24 and 28 on the other side of the tube axis. In other words, as indicated by the small o's in Fig. 4, the greater length of the conductor groups on one side of the tube axis causes the flux pattern to extend further towards the front of the tube on this side of the axis.

The set of coils 20 just described serves to produce the proper deflection of the electron beams when they are deflected above the tube axis. In order to obtain the proper deflection of the electron beams below the tube axis, it is necessary to include a second set of deflection coils for producing a field corresponding to the field pattern 16e of Fig. 4. This second set of coils may be identical to the first set 20 except that this second set is rotated through 180° so that the longer conductor groups are on the lower side of the tube axis. The position of this second set of coils is represented by the dash line outline 30 of Fig. 5a.

Figure 6:
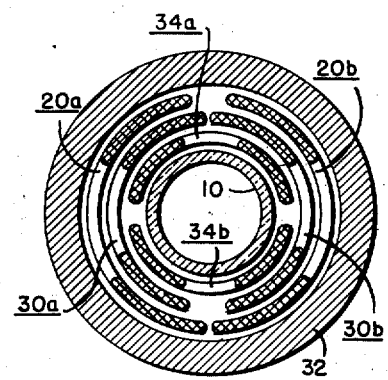
Fig. 6 is a cross-sectional view taken along the section line 6—6 of Fig. 1 and illustrates a representative arrangement of the deflection coils in a deflection yoke constructed in accordance with the present invention.

The positioning of both sets of coils with respect to the cathode-ray tube 10 of Fig. 1 may be better seen by referring to Fig. 6 which is a cross-sectional view taken along the section line 6—6 of Fig. 1. As is indicated, the first set of vertical coils including the coils 20a and 20b may be placed outermost from the tube 10 while the coils 30a and 30b making up the second set of vertical coils 30 may be placed just inside the coils of the first set. The deflection yoke of Fig. 6 may also include a set of conventional horizontal deflection coils 34a and 34b for deflecting the beams back and forth in a horizontal direction. It is customary to position the horizontal deflection coils closer to the tube axis than the vertical coils because of the greater amount of power handled by the horizontal coils. It is also customary to inclose the entire yoke structure with a circular ring core 32 of magnetic material, such as iron or ferrite, for providing a low reluctance flux return path for the deflection fields.

An additional modification may be required of the coil construction in order to compensate for astigmatism or deforming of the cross sections of the beams due to slight curvatures introduced in the deflection fields because of the fact that some sets of the longitudinal conductors extend further than others. In other words, considering for the moment only the case of the deflection coil 20 illustrated in detail in Figs. 5a-5c, inclusive, the fact that the magnetic field towards the exit end of the yoke is produced by only conductors on one side of the tube axis, namely, the longer conductors making up the groups 22 and 26, causes the resulting flux lines to be somewhat curved in nature with the narrow side of the concave towards the current source represented by the longer conductors. This curvature tends to deform the shapes of the beam cross sections. It may be compensated for by introducing curvature in a reverse sense by adjusting the spacings between the longitudinal conductor groups. This modification of the spacing may be seen by referring to Fig. 5b wherein the heavy dots represent the centers of the longitudinal conductor groups. In order to develop linear flux over the central region of the tube 10, it is necessary that the group centers of adjacent groups be positioned 60° apart. By adjusting the spacing $d$ between the conductor groups 22 and 26 so that the centers are spaced apart by more than 60° and by adjusting the spacing $d'$ between the groups 24 and 28 so that their centers are spaced apart by less than 60°, a slight curvature of the flux lines over the center region of the tube 10 may be obtained. In this case, the inner side of the concave is towards the more closely spaced conductor groups 24 and 28, thereby compensating for the curvature of the opposite sense due to the greater length of the conductor groups 22 and 26. Such modification of the spacing or gap width may also be applied to the other set of vertical coils 30a and 30b. Such modification is indicated in Fig. 6 for all the sets of vertical deflection coils, the modification being that the wider gap should be between the conductor groups having the greater axial length.

Figure 5B:
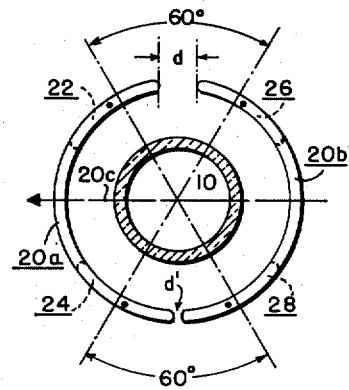
Figure 5C:
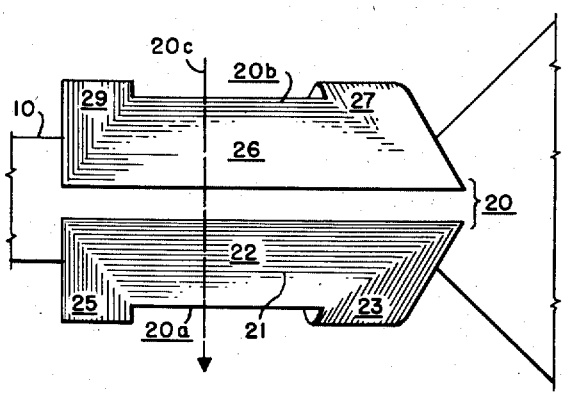
Figure 7:
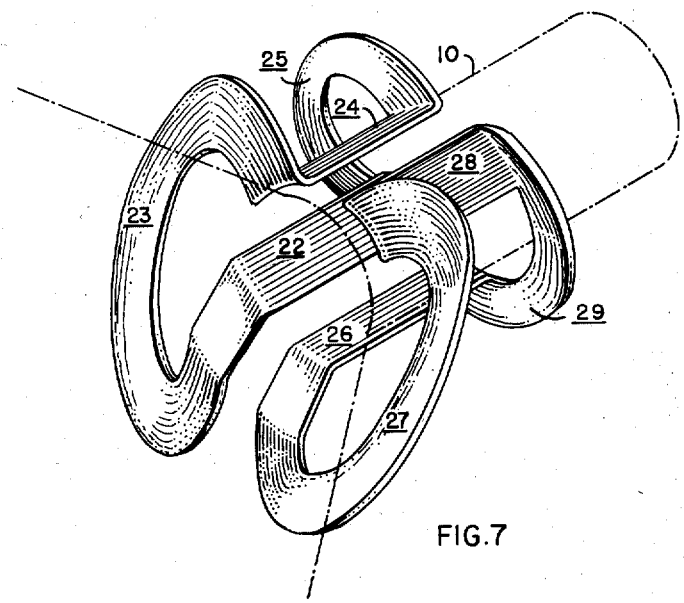
Fig. 7 is a perspective view of a pair of saddle-yoke type of deflection coils constructed in accordance with the present invention.

As mentioned, from an electrical standpoint, the end conductors comprising the conductor groups 23, 25, 27, and 29 of the coil 20 shown in Figs. 5a-5c, inclusive, are not of primary importance in producing the deflection fields and they may contribute undesired components to such fields. Accordingly, the positioning of these end conductors may take many different forms well known in the art depending on whether cylindrical coils, as indicated in Figs. 5a-5c, inclusive, toroidal coils, or saddle type coils are desired. To illustrate this point, reference is had to Fig. 7 which shows a pair of saddle type coils corresponding to the pair of coils 20a and 20b of Figs. 5a-5c, inclusive. These coils are exactly like the coils of Figs. 5a-5c, inclusive, except that the end conductors have been lifted up and spread back. However, in accordance with the teaching of this invention, the longitudinal conductor groups on one side of the tube axis are still longer than those on the other side of the tube axis. It should be mentioned in passing, however, that the end conductors, especially those at the exit end, may contribute some components which may be adjusted to provide secondary modifications of the end boundaries of the fields.

Up to this point the discussion has concerned modified forms of vertical deflection coils to replace the conventional forms of vertical deflection coils in a deflection yoke. It should be noted, however, that the present invention may be practiced without abandoning altogether the conventional vertical deflection coils normally included in a deflection yoke. In other words, to obtain the desired convergence correction the conventional coils might be retained, in which case the correction could be obtained by utilizing smaller auxiliary coils interleaved with the conventional coils. These small auxiliary or supplementary coils would, in accordance with the teachings of the present invention, comprise conductor groups having a greater axial length on one side of the tube axis than on the other, two sets of such auxiliary coils being necessary to supplement the conventional vertical deflection coils.

Up to this point the present invention has been described with reference to the illustrative case of deflection in the vertical direction. This was done by assuming that the electron guns were arrayed in a vertical plane. It is to be clearly understood, however, that the teachings of the present invention may be utilized equally well to produce the desired convergence where the electron beams are incident into the main deflection field region in a horizontal plane.

Figure 8:
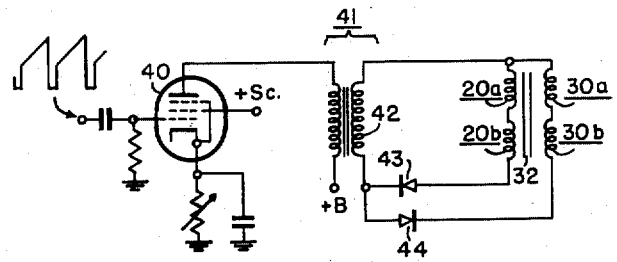
Fig. 8 is a representative embodiment of one type of deflection circuit for use with the deflection coils of the present invention.

Referring now to Fig. 8 of the drawings, there is shown circuit means for supplying deflection signals primarily to one set of deflection coils when the electron beams are to be deflected on one side of the tube axis and primarily to the other set of deflection coils when the electron beams are to be deflected on the other side of the tube axis. The circuit means shown in Fig. 8 is particularly useful in the case where the vertical deflection coils are modified in accordance with the present invention and, hence, is illustrated in this environment. More particularly, the circuit of Fig. 8 includes a vertical output amplifier stage including an amplifier tube 40 and an output transformer 41 for supplying deflection current signals suitable for deflecting the electron beams from one side of the image to the other, which in the case of vertical deflection is from the top side to the bottom side. The vertical output stage up to the tube 40 and transformer 41 is of conventional construction and operation. The connection and type of circuit elements coupled to the secondary winding 42 of the transformer 41, however, are not conventional and include the series connected coils 20a and 20b making up one of the sets of vertical deflection coils and these coils 20a and 20b are connected to the secondary winding 42 by way of rectifier circuit means represented, for example, by a semiconductor diode 43. In a similar manner the coils 30a and 30b which make up the other set of vertical deflection coils are series connected across the secondary winding 42 by way of a second rectifier circuit means represented, for example, by another semiconductor diode 44.

In operation, the transformer 41 supplies to the secondary winding thereof a saw-tooth current wave form in a conventional manner. The diodes 43 and 44, which are poled oppositely to one another, serve to rectify the sawtooth current signal so that, for example, only the positive half of such signal flows through the coils 20a and 20b while only the negative half flows through the other coils 30a and 30b. The positive half of such current sawtooth signal is, of course, the part which causes deflection on one side of the tube axis while the negative half is the part which causes deflection on the other side of the tube axis. Accordingly, either one or the other set of coils is primarily energized depending on which way the beams are being deflected at that particular moment.

The technique just discussed of using additional diodes for controlling the energization of the vertical deflection coils may, if desired, also be used in the case where the horizontal deflection coils are modified in accordance with the present invention. However, because of the greater power levels being handled by the horizontal deflection circuit, it would be desirable to have a way of separating the directions of current flow without having to utilize additional circuit elements. To this end, a novel and particularly advantageous form of horizontal deflection circuit has been devised and is illustrated in Fig. 9.

Figure 9:
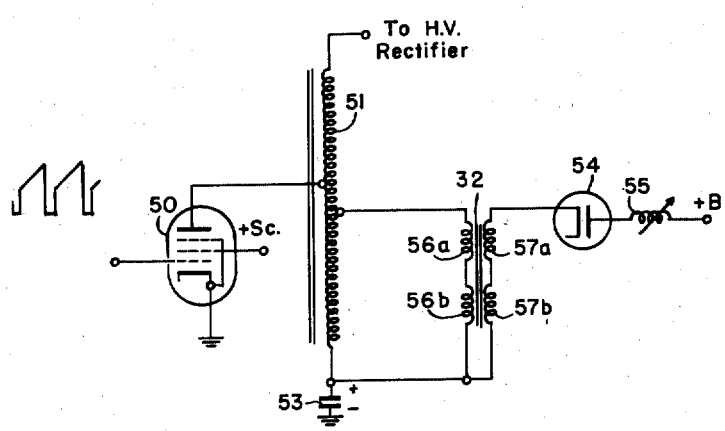
Fig. 9 is a representative embodiment of a novel type of horizontal deflection circuit for use with the deflection coils of the present invention.

Referring now to Fig. 9 of the drawings, the horizontal deflection circuit there shown enables two sets of horizontal deflection coils to be separately energized without need for additional circuit components. More particularly, the circuit of Fig. 9 includes a horizontal output tube 50, and a horizontal output transformer 51 coupled thereto in a conventional manner, the circuit being completed by way of a condenser 53. The horizontal deflection circuit also includes a damper diode 54 which may be coupled by way of a horizontal linearity coil 55 to a source of direct-currency energy +B. In horizontal deflection circuits heretofore utilized, the other end of the damper diode 54 is connected to the output transformer 51 for supplying direct-current energy to the output tube 50, the presence of the diode 54 serving to damp the oscillation of the horizontal deflection circuit subsequent to the retrace interval and recover remaining stored energy as useful deflection current.

As is well known, the circuit parameters may be adjusted so that during approximately the first half of the trace interval the damper diode 54 is conductive while during the second half of the trace interval the output tube 50 is conductive, the composite current flow having the desired saw-tooth wave form. Advantage may be taken of this sharing of the current flow by the output tube 50 and the damper diode 54 so as to produce the desired energization of first one set of horizontal deflection coils and then another set. To this end, a first set of deflection coils including coils 56a and 56b is connected in parallel with a portion of the output transformer 51 so that the current flow when the output tube is conductive will be from the condenser 53, up through the coils 56a and 56b, by way of the transformer 51 and then through the output tube 50. Energization of a second set of deflection coils including coils 57a and 57b is obtained by connecting these coils in series between the damping diode 54 and the horizontal output transformer 51 as shown. During the other half of the trace interval when the damper diode 54 is conductive, the current flow will be by way of such diode 54, down through the other set of coils 57a and 57b and into the condenser 53. In this manner, the sets of coils will be alternately energized in accordance with the polarity of the current flow and, hence, in accordance with the side of the tube axis on which the beams are being deflected.

In retrospect, it will be seen that the technique of the present invention shifts the matter of convergence correction from a circuit complexity to an internal complexity in the deflection yoke. There are, however, several reasons which indicate that this shift is a decidedly desirable one. As mentioned, the dynamic convergence circuits heretofore utilized are characterized by having a multitude of adjustable controls. In accordance with the present invention, however, there are no adjustable controls as the correction factors have been properly built into the yoke coils and in a permanent manner. Also important is the fact that the modification required of the yoke coils is one that may be relatively easily obtained. In other words, there is no greater difficulty in winding the coil shapes necessary for practicing the present invention than there is in winding deflection coils of a conventional shape.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A magnetic deflection system for a cathode-ray tube wherein the different angles of incidence of the electrons into the deflection field region cause the electrons to be deflected differently and, hence, to converge at points different from a surface of the display screen structure as the electrons are deflected from side to side, the system comprising: a first deflection coil for deflecting the electrons in a given image direction on a first side of the tube axis, the axial length of the coil portions on this first side of the tube axis being longer than those on a second side of the axis; a second deflection coil for deflecting the electrons in the same image direction but on the second side of the tube axis, the axial length of the coil portions on this second side of the tube axis being longer than those on the first side of the axis; the proportioning of the axial lengths of the deflection coils serving to produce a composite deflection field having an end boundary of the proper shape to enhance the convergence of the electrons at the screen structure surface; and circuit means for supplying deflection signals marily to the first deflection coil when the electrons to be deflected on the first side of the tube axis primarily to the second deflection coil when the elect are to be deflected on the second side of the tube ax 2. A magnetic deflection system for a multi color cathode-ray tube wherein the different angle incidence of the electron beams into the deflection region cause the beams to be deflected differently hence, to converge at points different from the sur defined by the color control structure as the beams deflected from side to side, the system comprising: a deflection coil for deflecting the electron beams in a g image direction on a first side of the tube axis, the length of the coil portions on this first side of the axis being longer than those on a second side of the a second deflection coil for deflecting the electron be in the same image direction but on the second side o tube axis, the axial length of the coil portions on second side of the tube axis being longer than thos the first side of the axis; the proportioning of the lengths of the deflection coils serving to produce a c posite deflection field having an end boundary of proper shape to enhance the convergence of the elec beams at the control structure surface; and circuit m for supplying deflection signals primarily to the firs flection coil when the electron beams are to be defle on the first side of the tube axis and primarily to second deflection coil when the electron beams are t deflected on the second side of the tube axis.

3. A magnetic deflection system for a multi color cathode-ray tube wherein the different angle incidence of the electron beams into the deflection region cause the beams to be deflected differently hence, to converge at points different from the sur defined by the color control structure as the beams deflected from side to side, the system comprising: a set of deflection coils for deflecting the electron bean a given image direction on a first side of the tube the axial length of the coil portions on this first si the tube axis being longer than those on a second of the axis; a second set of deflection coils for defle the electron beams in the same image direction bu the second side of the tube axis, the axial length o coil portions on this second side of the tube axis l longer than those on the first side of the axis; the portioning of the axial lengths of the deflection serving to produce a composite deflection field havir end boundary of the proper shape to enhance the vergence of the electron beams at the control stru surface; and circuit means for supplying deflection si primarily to the first set of deflection coils wher electron beams are to be deflected on the first side o tube axis and primarily to the second set when the tron beams are to be deflected on the second side o tube axis.

4. A magnetic deflection system for a multi-gun cathode-ray tube wherein the different angles of incic of the electron beams into the deflection field region the beams to be deflected differently and, hence, to verge at points different from the surface defined b color control structure as the beams are deflected side to side, the system comprising: a first set of d tion coils for deflecting the electron beams in a image direction on a first side of the tube axis, th of coils comprising longitudinal groups of conductors tioned parallel to the longitudinal axis of the cathod tube, the effective axial length of the conductor g on the first side of the tube axis being longer tha effective axial length of those on a second side o axis; a second set of deflection coils for deflectin electron beams in the same image direction but o second side of the tube axis, this set of coils comp longitudinal groups of conductors positioned parall the longitudinal axis of the cathode-ray tube, the effe axial length of the conductor groups on the second side of the tube axis being longer than the effective axial length of those on the first side of the axis; the proportioning of the axial lengths of the conductor groups of each set serving to produce a pair of magnetic deflection fields each having a generally oblique end boundary but at different angles relative to the tube axis thereby to produce a composite end boundary of the proper shape to enhance the convergence of the electron beams at the control structure surface; and circuit means for supplying deflection signals primarily to the first set of deflection coils when the electron beams are to be deflected on the first side of the tube axis and primarily to the second set when the electron beams are to be deflected on the second side of the tube axis.

5. A magnetic deflection system for a multi-gun color cathode-ray tube wherein the different angles of incidence of the electron beams into the deflection field region cause the beams to be deflected differently and, hence, to converge at points different from the surface defined by the color control structure as the beams are deflected from side to side, the system comprising: a first set of deflection coils for deflecting the electron beams in a given image direction on a first side of the tube axis, this set of coils comprising longitudinal groups of conductors positioned parallel to the longitudinal axis of the cathode-ray tube, the effective axial length of the conductor groups on the first side of the tube axis being longer than the effective axial length of those on a second side of the axis, the spacing between the centers of the conductor groups on the first side of the tube axis being greater than 60° while the spacing between the centers of the conductor groups on the second side of the tube axis is less than 60° to compensate for beam astigmatism caused by the difference in axial lengths; a second set of deflection coils for deflecting the electron beams in the same image direction but on the second side of the tube axis, this set of coils comprising longitudinal groups of conductors positioned parallel to the longitudinal axis of the cathode-ray tube, the effective axial length of the conductor groups on the second side of the tube axis being longer than the effective axial length of those on the first side of the axis, the spacing between the centers of the conductor groups on the second side of the tube axis being greater than 60° while the spacing between the centers of the conductor groups on the first side of the tube axis is less than 60° to compensate for beam astigmatism caused by the difference in axial lengths; the proportioning of the axial lengths of the conductor groups of each set serving to produce a pair of magnetic deflection fields each having a generally oblique end boundary but at different angles relative to the tube axis thereby to produce a composite end boundary of the proper shape to enhance the convergence of the electron beams at the control structure surface; and circuit means for supplying deflection signals primarily to the first set of deflection coils when the electron beams are to be deflected on the first side of the tube axis and primarily to the second set when the electron beams are to be deflected on the second side of the tube axis.

6. A magnetic deflection system for a multi-gun color cathode-ray tube wherein the different angles of incidence of the electron beams into the deflection field region cause the beams to be deflected differently and, hence, to converge at points different from the surface defined by the color control structure as the beams are deflected from side to side, the system comprising: a first set of deflection coils for deflecting the electron beams in a given image direction on a first side of the tube axis, the axial length of the coil portions on this first side of the tube axis being longer than those on a second side of the axis; a second set of deflection coils for deflecting the electron beams in the same image direction but on the second side of the tube axis, the axial length of the coil portions on this second side of the tube axis being longer than those on the first side of the axis; the proportioning of the lengths of the deflection coils serving to produce posite deflection field having an end boundary proper shape to enhance the convergence of the e beams at the control structure surface; supply means for supplying a deflection current signal for deflecting the electron beams from one side image to the other; first rectifier circuit means f necting the first set of deflection coils to the sup cuit means for enabling current flow through the when the electron beams are to be deflected on t side of the tube axis; and second rectifier circuit for connecting the second set of deflection coils supply circuit means for enabling current flow t these coils when the electron beams are to be de on the second side of the tube axis.

7. A magnetic deflection system for a multi-gun cathode-ray tube wherein the different angles of inc of the electron beams into the deflection field cause the beams to be deflected differently and, he converge at points different from the surface defi the color control structure as the beams are de from side to side, the system comprising: a first deflection coils for deflecting the electron beam horizontal image direction on the left side of th axis, the axial length of the coil portions on th side of the tube axis being longer than those on th side of the axis; a second set of deflection coils f deflecting the electron beams in the horizontal direction but on the right side of the tube axis, th length of the coil portions on this right side of th axis being longer than those on the left side of th the proportioning of the axial lengths of the def coils serving to produce a composite horizontal tion field having an end boundary of the proper sh enhance the convergence of the electron beams control structure surface; a horizontal output circ cluding a horizontal output tube and a horizontal transformer for controlling the flow of horizont flection currents, the parameters of the output being proportioned so that the output tube is cond over approximately one-half of the deflection tr damper diode for supplying energy to the hori output circuit; one set of deflection coils being c in parallel with a portion of the output transforn that deflection current will flow therethrough whe horizontal output tube is conductive; and the oth of deflection coils being coupled in series betwee damper diode and the horizontal output circuit s deflection current will flow therethrough when the d diode is conductive during the other half of the tion trace.

8. A magnetic deflection yoke for a cathode-ray wherein the different angles of incidence of the ele into the deflection field region cause the electrons deflected differently and, hence, to converge at different from a surface of the display screen str as the electrons are deflected from side to side, the comprising: a first set of deflection coils for defl the electrons in a given image direction on a firs of the tube axis, the axial length of the coil po on this first side of the tube axis being longer those on a second side of the axis; and a second deflection coils for deflecting the electrons in the image direction but on the second side of the tube the axial length of the coil portions on this second of the tube axis being longer than those on the firs of the axis; the proportioning of the axial lengt the deflection coils serving to produce a composit flection field having an end boundary of the p shape to enhance the convergence of the electro the screen structure surface.

9. A magnetic deflection system comprising: a ode-ray tube including means for emitting electron a display screen structure having a phosphor scree cited by the electrons to produce an image thereon, wherein the different angles of incidence into the deflection field region of the tube of the components of electron motion parallel to a predetermined plane cause the electrons to be deflected differently when deflected in an image direction parallel to this plane and, hence, to converge at points different from a surface of the display screen structure; a first set of deflection coils for deflecting the electrons in said image direction on a first side of the tube axis, the axial length of the coil portions on this first side of the tube axis being longer than those on a second side of the axis; a second set of deflection coils for deflecting the electrons in the same image direction but on the second side of the tube axis, the axial length of the coil portions on this second side of the tube axis being longer than those on the first side of the axis; the proportioning of the axial lengths of the deflection coils serving to produce a composite deflection field having an end boundary of the proper shape to enhance the convergence of the electrons at the screen structure surface; and circuit means for supplying deflection signals primarily to the first set of deflection coils when the electron beams are to be deflected on the first side of the tube axis and primarily to the second set when the electron beams are to be deflected on the second side of the tube axis.

References Cited in the file of this patent

UNITED STATES PATENTS

| | | |
|---|---|---|
| 2,431,396 | Hansell | Nov. 25, 1947 |
| 2,562,395 | Schlesinger | July 31, 1951 |
| 2,570,425 | Bocciarelli | Oct. 9, 1951 |
| 2,606,304 | Moore | Aug. 5, 1952 |
| 2,621,308 | Cherry | Dec. 9, 1952 |
| 2,671,129 | Moore | Mar. 2, 1954 |
| 2,796,552 | Dietch | June 18, 1957 |

FOREIGN PATENTS

| | | |
|---|---|---|
| 1,086,373 | France | Aug. 11, 1954 |

OTHER REFERENCES

Martin: Tele-Tech and Electronic Industries, December 1954, pages 82, 83, 140, and 141.